United States Patent

[11] 3,569,726

[72] Inventors Morris W. Reid;
       Harry E. Kline, Racine, Wis.
[21] Appl. No. 836,916
[22] Filed June 26, 1969
[45] Patented Mar. 9, 1971
[73] Assignee J. I. Case Company
       Racine, Wis.

[54] IGNITION SAFETY SYSTEM FOR GARDEN TRACTORS
     4 Claims, 1 Drawing Fig.
[52] U.S. Cl..................................................... 307/10,
                                                          180/101
[51] Int. Cl..................................................... H02g 3/00
[50] Field of Search........................................ 180/101,
                            104; 307/9, 10; 200/85 (A), 85, 89

[56] References Cited
     UNITED STATES PATENTS
     2,612,232   9/1952   Morrison..................... 180/101X 3,229,452   1/1966   Hasenbank................... 180/101X Primary Examiner—Robert K. Schaefer
Assistant Examiner—H. J. Hohauser
Attorney—Arthur J. Hansmann ABSTRACT: An ignition safety system for garden tractors, with an electric circuit including a battery, a generator, and an ignition coil. A plurality of electric switches are connected in the circuit, and a weight-responsive tractor seat has one of the switches thereunder for closing when the operator sits in the seat. There are two more of the said switches which are manually operated, preferably by keys, with one of the two switches being in series connection with the seat-operated switch, and with the other of the two switches being in parallel connection with the seat-operated switch to electrically bypass the seat-operated switch, all at the discretion of the operator.

PATENTED MAR 9 1971  3,569,726

INVENTORS:
MORRIS W. REID
HARRY E. KLINE

*Arthur J. Hansmann*
ATTORNEY

IGNITION SAFETY SYSTEM FOR GARDEN TRACTORS

This invention relates to an ignition safety system for garden tractors. More particularly, it relates to the ignition system for garden tractors having weight-responsive operator seats, such that when the operator sits in the seat, the electrical system is closed and the tractor and its attachments can then be operated.

BACKGROUND OF THE INVENTION

Ignition safety systems for garden tractors, and the type of system utilizing seat-operated switches, is generally well known in the art. Thus, the prior art is already aware of safety systems where the tractor electric circuit is in an operative position when the operator is sitting on the seat, but as soon as the operator removes his weight from the seat, the electric system is then inoperative. Generally the tractor seat lowers when the operator sits in it, and an electric switch is mounted to respond to the lowered seat position, and this controls the electric circuit, either by opening or closing the switch, depending upon the particular arrangement and desire. One arrangement is to have the seat-operated switch closed when the operator sits on the seat, and the switch then automatically opens when the operator gets off the seat, and the opening of the switch affects the electric circuit to stop the flow of current to the tractor engine, for instance, so that the tractor is automatically stopped when the operator gets off the seat. In this manner, when the tractor is powering a rotary lawn mower, or other inherently dangerous implement, or for any other reason, when the operator gets off the seat, the danger is removed by having the rotary mowers stop operation. Such structural arrangement is in the nature of the well-known dead man's switch where the switch is open when the operator is no longer holding the switch in the closed position.

The problem with the prior art type of safety switches described above is that there are times when it is desirable to have the tractor continue running when the operator is actually removed from the seat and may even be off the tractor completely. That is, the safety switch described may be desired only with a powering of certain implements, such as the rotary mower, or only when certain operators are using the tractor, or only under certain conditions of use, or the like. At other times, and even with occasions of the examples mentioned, such as with the use of rotary mowers, it may still be desirable to have the tractor running when the seat or like dead man's or safety switch is not in the position for operativeness of the electric system.

By way of further and a more specific example, when a rotary lawn mower is used on the garden tractor, and when a relatively unskilled or inexperienced person is using the tractor, it is then desirable to have the safety switch effective. However, when a more reliable or cautious and skilled operator is using the tractor, then the safety switch can actually be a nuisance if it is effective in stopping the running of the tractor every time the operator gets off the seat. Also, even though certain inherently dangerous or other types of implements are being powered by the tractor, or even under certain dangerous or other peculiar conditions of operating the tractor, it is desirable to have the tractor continue running even when the operator is off the seat and the safety switch is then not in the position for normally continuing the running of the tractor.

Accordingly, it is a general object of this invention to provide an ignition safety system for garden tractors, wherein the safety system is operative under certain conditions, but the system is also effective to bypass the safety portion of the system so that the tractor can be operated without the safety switch. That is, the operator has the election of using or not using the safety switch.

Still further, it is an object of this invention to provide a selective type of ignition safety system for garden tractors, wherein the operator is required to perform specific steps in running the tractor when he desires to run it without the safety switch being effective. The structure disclosed herein for accomplishing this object includes the provision of two key-operated switches, each requiring a separate key. Then, the operator must have two keys in order to operate the system without the safety switch being effective and then, if one were not to operate the tractor without the safety switch being effective, he could not do so unless he had the two keys. However, if he has only one key for operating the one switch only, then the safety switch must also be operative in order for the tractor to be running. The consequence of this type of system is that a supervisor can give an operator only one key, and then the safety switch is operative. Of course if the operator has the two keys, then the safety switch is not operative and the tractor can be run even though the operator is not sitting in the seat.

SUMMARY OF THE INVENTION

This invention relates to an ignition safety system for garden tractors, including a seat responsive safety switch for controlling the electric circuit of the tractor, and including two additional switches in the electric circuit for selectively and manually controlling the electric circuit to place it in the operative or inoperative condition. One of the two additional switches is series connected with the seat safety switch, and the other of the two additional switches is parallel connected with the seat safety switch to bypass the seat safety switch at the election of the operator.

DETAILED DESCRIPTION OF THE PREFERRED EMBODIMENT

Figure 1:
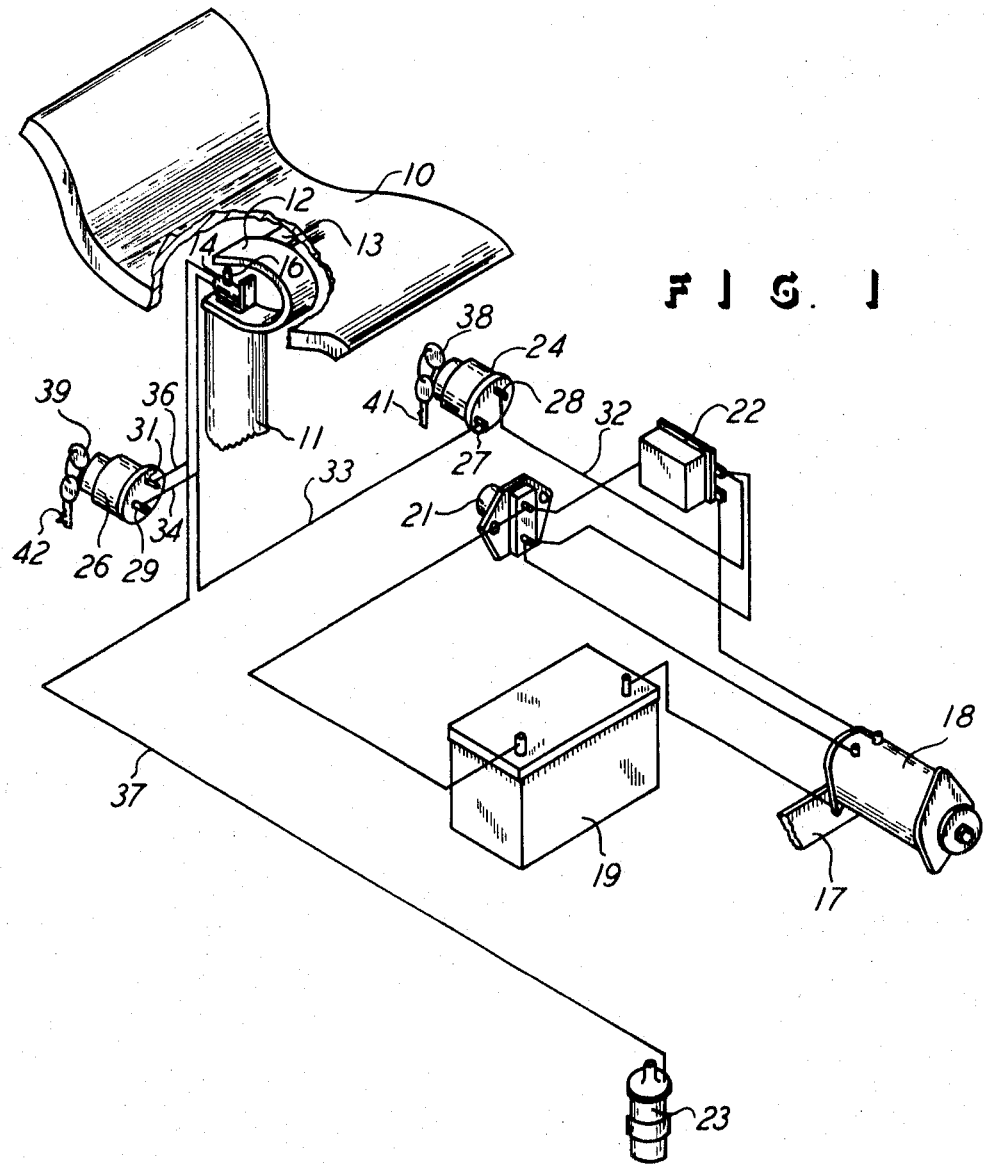
FIG. 1 is a diagrammatic and perspective view of a preferred embodiment of this invention.

A fragment of a garden tractor is shown in that the drawing shows an operator's seat 10 mounted on a tractor support member 11. A weight-responsive mounting or spring member 12 connects to the tractor seat frame 13 and extends above the pedestal or support 11. With this arrangement, when the operator occupies the seat 10, the spring 12 will flex under the operator's weight, and a pressure-responsive safety switch 14 is actuated in response to the flexing of the spring 12. That is, the switch 14 is of any conventional and well-known pressure-responsive type, and it has a plunger 16 extending upwardly toward the spring 12 to be contacted by the latter when the operator is sitting in the seat. Such contact of the plunger 16 depresses the plunger and causes the switch 14 to be in the closed and operative position.

It will also be understood that the tractor includes the conventional components of well-known garden tractors of the riding type, such as that shown in U.S. Pat. No. 3,229,452. That is, the tractor used in the present invention can be used to power a rotary mower, such as shown in the cited patent. Of course many other types of implements could also be powered by a tractor of this invention, and the tractor could be used for powering various implements or tools, such as that shown in U.S. Pat. No. 3,258,083.

The drawings also show a fragment 17 of a tractor frame which has an electric starter-generator 18 thereon. Further, there is shown an electric battery 19, a starter button 21, a voltage regulator 22, and an ignition coil 23. The aforementioned components are all conventional, and they are incorporated in the tractor in the usual and well-known manner for running the tractor engine which is not shown. The drawing also shows the electric wires connecting the components to electrically complete the system or circuit in the conventional manner. Two normally opened and manually operated switches 24 and 26 are also shown in the circuit, and electric terminals 27 and 28 are shown on switch 24 and electric terminals 29 and 31 are shown on switch 26. Electric wire 32 connects terminal 28 into the system, and electric wire 33 connects switch 24 with switch 14. Electric wire 34 connects one side of switch 26 with one side of both the switches 14 and 24, and electric wire 36 connects the other side of switch 26 with the wire 37 extending between the switch 14 and the ignition coil 23. It will therefore be understood that all of the switches are effective on the ignition coil 23 so that they respectively control the flow of current to the coil 23 and thereby to the unshown tractor engine, as desired.

Therefore, switch 24 is in a series connection with the seat switch 14, in the circuit, and switch 26 is in a parallel connection with seat switch 14, in the circuit. With this arrangement, at all times of running the engine, switch 24 must be in the closed position. However, closing either switch 14 or 26, but not both, is also required to complete the circuit to the ignition coil 23. Of course when the operator is occupying the seat 10, then the switch 14 is closed and the circuit is complete regardless of the position of switch 26. However, when the operator is not in the seat 10 and therefore the switch 14 is not closed, only upon closing switch 26 will the circuit be completed for running the tractor engine.

Switches 24 and 26 can be of different structural type so that they are responsive only to different structurally shaped keys having different teeth. Thus, a key 38 is shown engaged with switch 24, and a key 39 is shown engaged with switch 26 and the keys 38 and 39 are switch control members. Keys 38 and 39 may also be of different structural type, so that they have different teeth, such as the shown key teeth 41 and 42 on the companion keys hanging on keys 38 and 39, respectively. Also, the lock-type switches 24 and 26 and the lock keys 38 and 39 may all be structurally the same, but it would still require two keys for simultaneous operating of the two key-operated or lock-type switches 24 and 26, when that simultaneous type of operation is desired.

With the structure and system described, the operator having only key 38 must occupy the seat 10 in order to have the tractor engine running. However, if it is desired to have the tractor engine running when the seat 10 is not occupied, then the operator must have both keys 38 and 39 so that he can close both switches 24 and 26 and thereby complete the circuit to the engine. In closing switch 26, the operator is bypassing the seat safety switch 14, and this he may desire to do.

We claim:

1. In an ignition safety system for a garden tractor, an electric circuit including a battery and a generator and an ignition coil and a plurality of electric switches controlling flow of electric current in said circuit, a tractor seat having a weight-responsive support for lowering said seat under the weight of the operator, a first one of said electric switches being responsive to the lowering of said seat to be electrically closed when said seat is occupied and to be electrically open when said seat is unoccupied, the improvement comprising all of said switches being separate devices and independently operative, a separate control member for each respective one of the other of said switches, said other of said plurality of switches being two normally open and manually operated switches and at all times all said switches being operative independent from each other, one of said manually operated switches being electrically connected in series with said first one of said switches, and the other of said manually operated switches being electrically connected in parallel with said first one of said switches and connected in said circuit to electrically bypass said first one of said switches.

2. The subject matter of claim 1, wherein said two manually operated switches are key-operated switches, and said control members for said two manually operated switches are two keys for operating said two manually operated switches.

3. The subject matter of claim 2, wherein said two keys are structurally different relative to each other by having different arrangements of teeth, and said two manually operated switches are structurally different relative to each other, with one of said two manually operated switches being operative only in response to the use of only a respective one of said two keys, and with the other of said two manually operated switches being operative only in response to the use of only the other of said two keys.

4. The subject matter of claim 2, wherein said two keys are structurally the same relative to each other by having the same arrangement of teeth, and said two manually operated switches are structurally the same relative to each other, with both of said manually operated switches being operative in response to each of said two keys.